United States Patent [19]

Guilino et al.

[11] Patent Number: 4,946,270

[45] Date of Patent: Aug. 7, 1990

[54] PROGRESSIVE POWER OPHTHALMIC LENS

[75] Inventors: Günther Guilino, Munich; Rudolf Barth, Vierkirchen; Hans Stetter, Munich, all of Fed. Rep. of Germany

[73] Assignee: Optische Werke G. Rodenstock, Munich, Fed. Rep. of Germany

[21] Appl. No.: 301,751

[22] PCT Filed: May 14, 1988

[86] PCT No.: PCT/DE88/00286

§ 371 Date: Jan. 11, 1989

§ 102(e) Date: Jan. 11, 1989

[87] PCT Pub. No.: WO88/08994

PCT Pub. Date: Nov. 17, 1988

[30] Foreign Application Priority Data

May 14, 1987 [DE] Fed. Rep. of Germany ....... 3716201

[51] Int. Cl.$^5$ .............................................. G02C 7/06
[52] U.S. Cl. .................................................. 351/169
[58] Field of Search ............................... 351/168–172

[56] References Cited

FOREIGN PATENT DOCUMENTS

| 39497 | 11/1981 | European Pat. Off. . |
| 132955 | 2/1985 | European Pat. Off. . |
| 3147952 | 7/1982 | Fed. Rep. of Germany . |
| 3331757 | 5/1985 | Fed. Rep. of Germany . |

Primary Examiner—Scott J. Sugarman
Attorney, Agent, or Firm—Antonelli, Terry, Stout & Kraus

[57] ABSTRACT

A progressive power ophthalmic lens having at least one surface contributing to an increase in power from a distant portion via a progressive zone to a reading portion, radii of curvature of horizontal section curves of the at least one surface contributing to an increase in power and having horizontal planes as a function of the distance from the main meridian decrease in a front surface in the region of the main meridian in the distant portion and increase in the rear surface in the distant portion and decrease in the reading portion, and the course of change of the curvature Δrh-rh(x,y)-rh (0,y) reverses with increasing distance x from the main meridian.

12 Claims, 9 Drawing Sheets $\Delta RH = RH(X,Y) - RH(0,Y)$

PROGRESSIVE POWER OPHTHALMIC LENS

BACKGROUND OF THE INVENTION

The present invention relates to a progressive power ophthalmic lens, in which at least one surface contributes to an increase in refractive power from the distant portion via the progressive zone to the reading portion, and in which the radii of curvature of the section curves (horizontal sections) of the surface or surfaces having horizontal planes contributing to the increase in refractive power decrease in the distant portion and increase in the reading portion in the front surface in the main meridian region as a function of the distance from the main meridian and increase in the distant portion and decrease in the reading portion in the rear surface, and in which the course of the change in curvature reverses with increasing distance from the main merdian.

STATE OF THE ART

In general, the problem with progressive power ophthamlic lenses is that the progression, i.e. the increase in refractive power on the main meridian leads to a sharp rise in astigmatism and in distortion in the peripheral regions due to the intersecting resulting from the continuity conditions of the surface.

For this reason, it has already been proposed in U.S. Pat. No. 2,878,721 to let the curvatures of the orthogonal or horizontal sections increase in the distant portion in the front surface with increasing distance from the main meridian and decrease in the reading portion. According to this publication, the result is a circular section between the distant and the reading portion as a transition from the region, in which the radii of curvature increase, to the region, in which the radii of curvature decrease. As a consequence of this concept, the differences between the distant and the reading portions in the peripheral region diminish and in this way there are less aberrations and, in particular, less lower surface astigmatism or distortion values.

A disadvantage of this known concept is, however, that the lines of the same surface refractive power are also curved upward in the region about the main merdian in the distant portion and downward in the reading portion; thus the lines of the same surface refractive power do not run horizontally. In order to reduce the curvature of the lines of the same surface refractive power upward or downward, it has already been proposed in U.S. Pat. No. 2,878,721 that the course of the change in curvature of horizontal or orthogonal sections reverse with increasing distance from the main meridian.

This concept described in U.S. Pat. No. 2,878,721 of changing the radii of curvature of horizontal or orthogonal sections in the main meridian region, the course of which is essentially the same as the course of the horizontal sections, has been adopted by DE-AS No. 20 44 639, DE-OS No. 30 16 935 and DE-OS No. 31 51 766.

Despite the reversal of the course of the change in curvature of the horizotal or orthogonal sections, the known surfaces have the disadvantage that the lines of the same surface refractive power are strongly bent especially in the progressive zone to both sides of the main meridian.

DESCRIPTION OF THE INVENTION

The object of the present invention is to provide a progressive ophthalmic lens in which the lines of the same surface refractive power run mainly horizontally at least in the main meridian region.

Strikingly, one solution to the aforementioned object is successful by proceeding from an ophthalmic lens and by selecting the surface in such a manner that the course of the change in the curvature of the horizontal sections with increasing distance from the main meridian is yielded by superimposing two functions $F_1(x,y)$ and $F_2(x,y)$. In accordance with the first function $F_1(x,y)$, the radius of curvature in the front surface initially increases or decreases in the rear surface, whereby the change in the radius of curvature reverses at a distance of approximately 14 to 26 mm. In accordance with the second function $F_2(x,y)$, the radius of curvature in the front surface initially decreases and increases in the rear surface, whereby the change in the radius of curvature again reverses at a distance of approx. 14 to 26 mm from the main meridian. The two functions are then superimposed in such a manner that the absolute values of the amplitudes of both functions change reversely along the main meridian at least in the progressive zone. Furthermore, functions $F_1$ and $F_2$ differ in pitch, the pitch of the second function in the main meridian region being greater.

This inventive design of the two functions yields regions in which the portion of one function predominates and, on the other hand, regions, in which the two functions influence the design of the progressive surface differently.

This invented design "decouples" the transition from the reading and the distant portions in the main meridian region and the corresponding transition in the regions distanced from the main meridian. By this means compromises, which are necessary in the peripheral regions, do not influence the design of the surface in the region about the main meridian, thus in that portion, which is intended for distinct vision. In other words, when the main meridian coordinates vary, the surface shows the transition from distant portion to reading portion properties for the region of the main meridian or the regions distanced from the main meridian.

By means of this design, the progressive surface or in the case of an ophthalmic lens with two progressive surfaces at least one of the two progressive surfaces is provided with a lens in which the surface astigmatism, which is concentrated in a known manner in the peripheral regions and in particular in the lower lateral peripheral regions, is the same or less than in most state-of-the-art lenses. Morerover, the change in astigmatism is less than in state-of-the-art lenses. Above all, however, in the invented ophthalmic lens, the course of the lines of the same dioptric refractive power or of the lines of the same is approximately horizontal in at least the region of the main meridian.

These properties of the invented progressive ophthalmic lens result from superimposing two functions yielding a matching of surfaces or a surface transition from the distant portion to the reading portion in the lateral regions, causing neither disturbing aberrations nor swinging motions due to incompatible distortions, etc. In particular, the invented surface design permits surface correction in the peripheral region largely independent of correction in the region of the main meridian; this is a prerequisite for the aforementioned advantageous properties.

The invented progressive surfaces have the additional advantage that it is possible to calculate them with comparatively little effort so that they can be calculated separately for each refractive power in the distant portion and each addition. In the state of the art, by way of comparison, only one surface is actually calculated. The other surfaces are derived from this surface by means of "similarity transformations". Needlesss to say that by this means poorer properties may under circumstances result.

It is especially advantageous if the reverse change of the absolute values of the amplitudes of both functions is such, that the amplitude of the second function is maximum in the distant portion and is practically equal or equal to zero in the reading portion. On the basis of changing the amplitudes of the second function, the latter is effective only in the distant portion and in the upper region of the progressive zone, but not in the lower part of the progressive zone and not in the reading portion.

It is particularly advantageous for the first function if the maximum amplitude initially increases from the lower edge of the ophthalmic lens to a maximum in region of the reading reference point and subsequently decreases to a value in the region of the distant portion, which remains at comparatively low values $>0$. The first function is, therefore, not only significant in the reading portion and in the lower part of the progressive zone, but also in the distant portion and in the upper part of the progressive zone.

The special reverse variation of the amplitudes of the two functions $F_1$ and $F_2$ results in a particularly well-balanced surface in the lateral peripheral regions, in which the distant portion with its special properties merges without interruption into the reading portion without any disturbing accumulation of astigmatism or jumps of astigmatism.

The invented design yields surfaces, which differ substantially from known surfaces:

By way of illustration, an advantageous further embodiment is described in which the radius of curvature initially changes in the region lateral of the main meridian due to the superimposition of the two functions $F_1$ and $F_2$ with varying pitch, but subsequently remains practically constant in the major region. Such variation behavior of the radii of curvature, which is contrary to that of the state of the art and in particular to that of DE-OS 31 47 952, results in a large, practically astigmatism-free distant (surface astigmatism $<0.5$ dpt and, in particular, $<0.25$ dpt) without disturbances in the lateral part of the transition zone.

Furthermore, it is especially advantageous if the maximum amplitudes of the two functions differ sharply from one another, in other words, if the variation of the radii of curvature in the reading portion is comparatively great, but comparatively small in the distant portion.

A further feature of the invented ophthalmic lens is that, contrary to the state of the art, nothing even near a circular section is yielded in neither the horizontal section nor the orthogonal section. To the contrary, in the transition zone, which according to the state of the art usually has one at least almost circular section, there is according to the present invention an apparently sinusoidal variation of the radius of curvature having comparatively large amplitudes as a function of the distance from the main meridian. In particular, it is an inventive element of an advantageous further embodiment of the present invention that the distant portion, which has, in comparison to the state of the art, a large region of low astigmastism values, is nonetheless not of spherical design.

Whereby — again contrary to the state of the art — the values of the radii of curvature may even initially become smaller and subsequently bigger than at the main meridian or vice versa. It is especially advantageous, however, if the radii of curvature of horizontal sections become initially smaller in the progressive zone with increasing distance from the main meridian and then become bigger than at the main meridian or initially bigger and subsequently approximately the same size as at the main meridian.

Furthermore, it may be characteristic for the invented ophthalmic lens that the reversal of the curvature change does not occur at a constant distance from the main meridian, but rather that the distance of the point from the main meridian, at which the curvature change of the function reverses, decreases in the direction of the lower edge of the ophthalmic lens.

The fundamental inventive concepts may, of course, be applied to any desired ophthalmic lens with one or two progressive surfaces and also to ophthalmic lenses, the main meridian of which is sinuous or plane. An especially simple design is, however, yielded when the main meridian is plane.

BRIEF DESCRIPTION OF THE DRAWING

The present invention is made more apparent in the following section using a preferred embodiment with reference to the attached drawing, in which.

DESCRIPTION OF A PREFERRED EMBODIMENT

In the preferred embodiment described herein, the front surface of the lens as a progressive surface without the intention of limiting the scope of the overall inventive idea. The progressive surface has a plane main meridian; in other words the main meridian is a curve running in a plane.

The system of coordinates is selected in such a manner that the Y axis lies in the plane (x =0), which also contains the main meridian.

Figure 1:
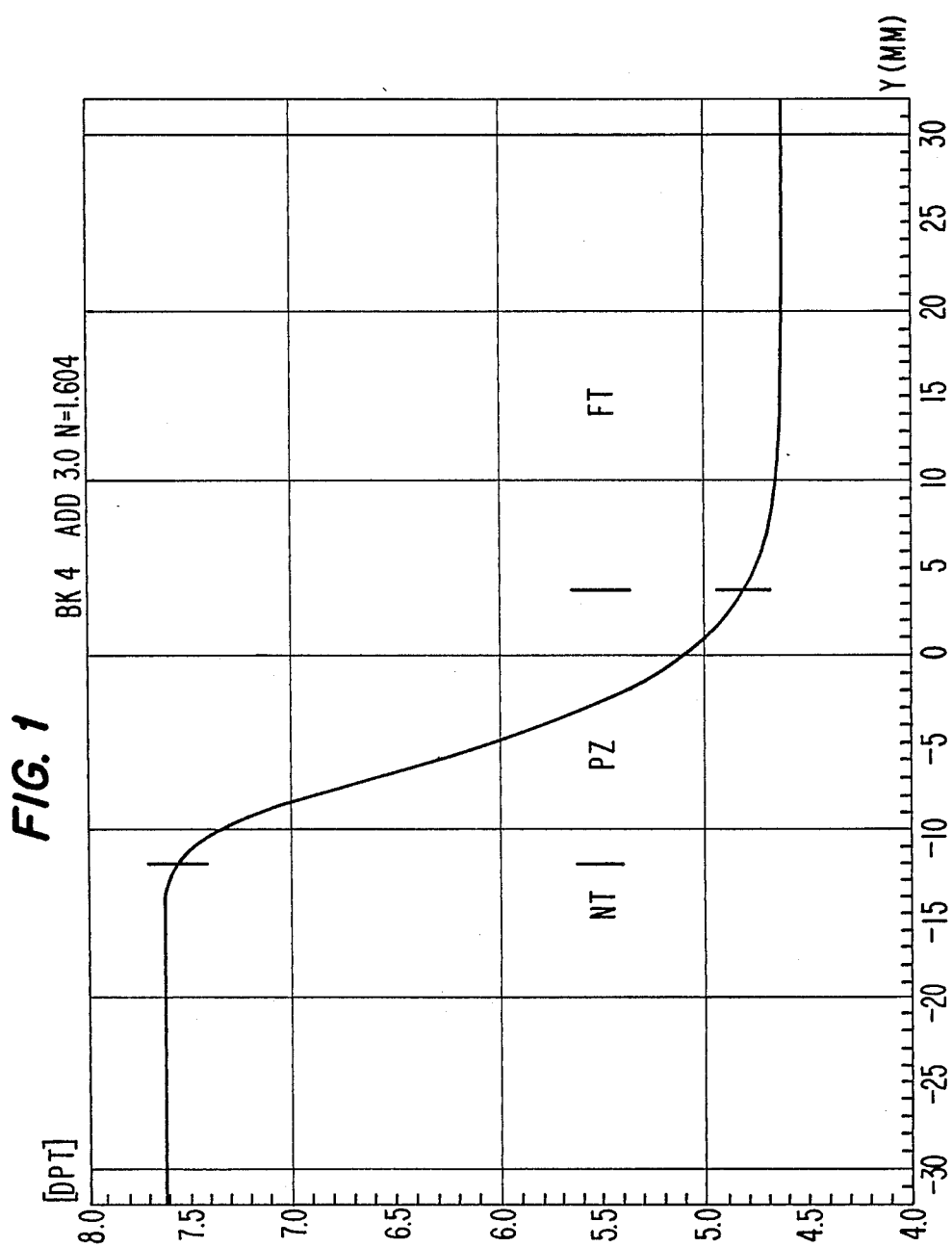
FIG. 1 shows the surface refractive power of an invented ophthalmic lens along the main meridian.

FIG. 1 shows the course of the surface refractive power in diopters (dpt) along the main meridian, i.e. along the y axis. As can be seen from FIG. 1 the surface refractive power on the main meridian in the distant portion FT is approx. 4.5 dpt; in the progressive zone PZ the refractive power on the main meridian increases by 3 dpt so that it is approx. 7.5 dpt in the reading portion NT; the illustrated preferred embodiment thus has a basal curve of 4 dpt and an addition A of 3 dpt.

Figure 2Q:
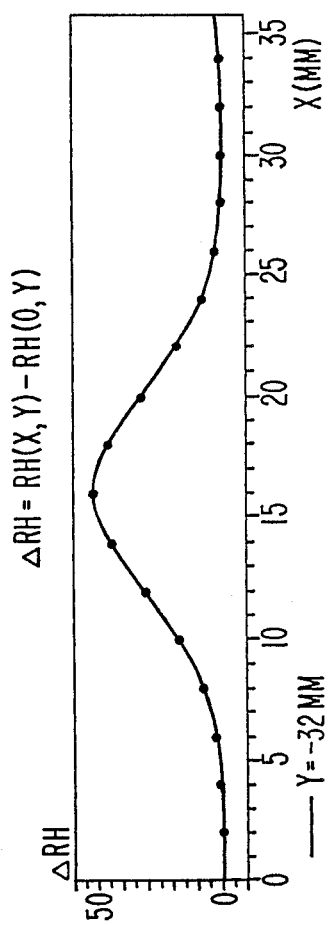
FIGS. 2a–2q show the radii of curvature of horizontal sections as the function of the distance from the main meridian.
Figure 2A:
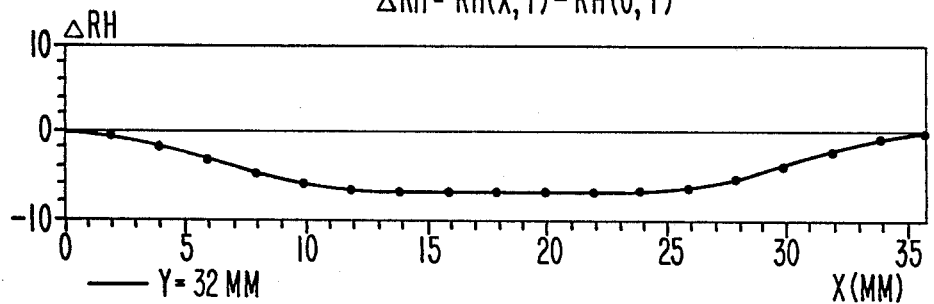

Furthermore, the lower limit of the distant portion FT, which is about y =4, and the upper limit of the reading portion NT, which is about y = −12, between which the actual progressive zone PZ extends, are indicated in FIG. 1. FIGS. 2a–2q show the course of the radii of curvature of the horizontal sections, i.e. the section curves of the progressive surfaces with planes y =const. depending on the coordinate x, i.e. the distance from the main meridian, whereby the difference or change Δrh of radius of curvature rh(x) for a specific x-value and of radius of curvature rh(0) for value x =0 is indicated in the figures.

The absolute values are not shown in the figures, but they are established by the condition that the astigmatism on the main meridian should have a specific value. In the illustrated preferred embodiment the surface astigmatism is zero on the main meridian in the distant portion FT and in the reading portion NT (within the range of work tolerances) and reaches a maximum value of 0.2 dpt in the progressive zone PZ. Naturally, it is also possible to design the main meridian completely as an umbilical line or to allow a bigger astigmatism maximum value along the main meridian.

By relinquishing the idea that the main meridian should be an umbilical line, in which the radii of curvature have to be the same size, more freedom is gained in the design of the progressive surface, whereby an improved correction can be achieved without the negligible astigmatism on the main meridian being disturbing to the wearer.

Figure 2B:
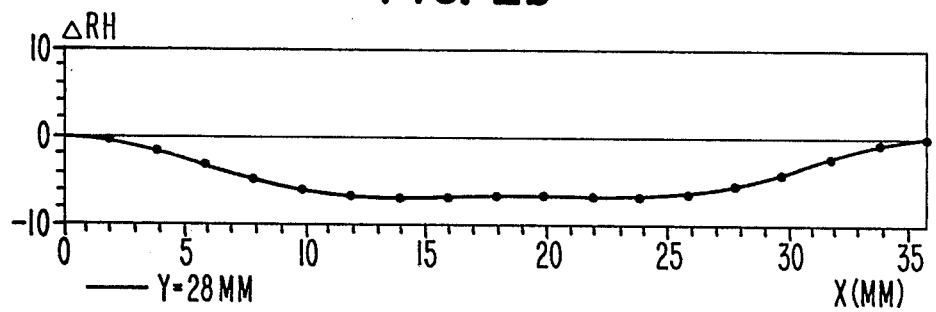
Figure 2C:
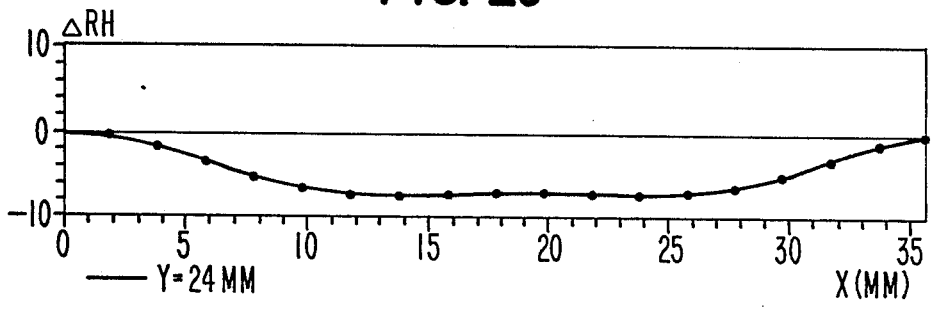

As can be seen in FIGS. 2a–2c, the change of the radius of curvature rh initially decreases with increasing distance x from the main meridian and then remains constant for a major region before it increases again.

Figure 2D:
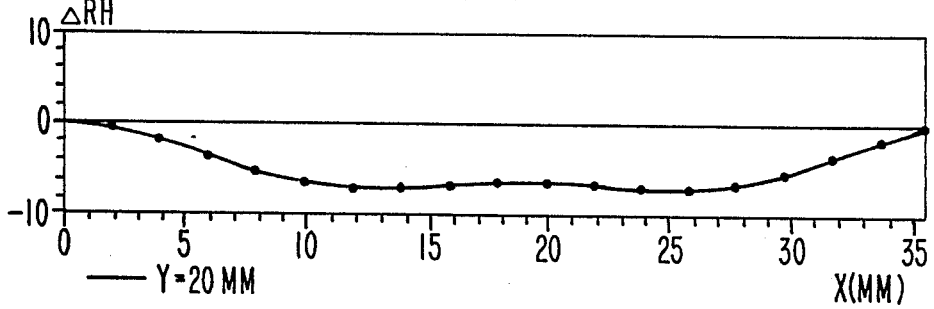
Figure 2E:
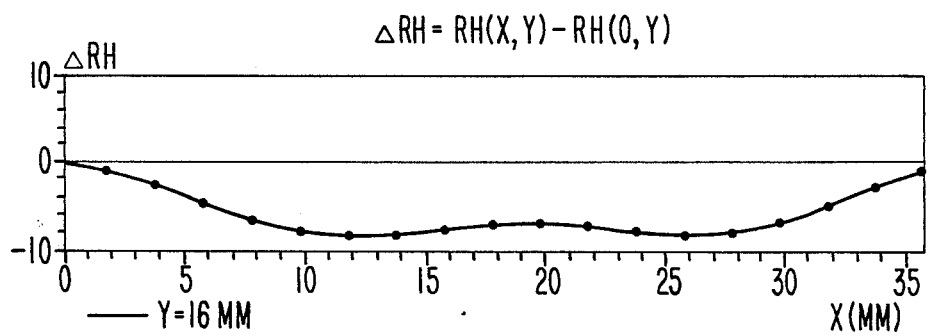
Figure 2F:
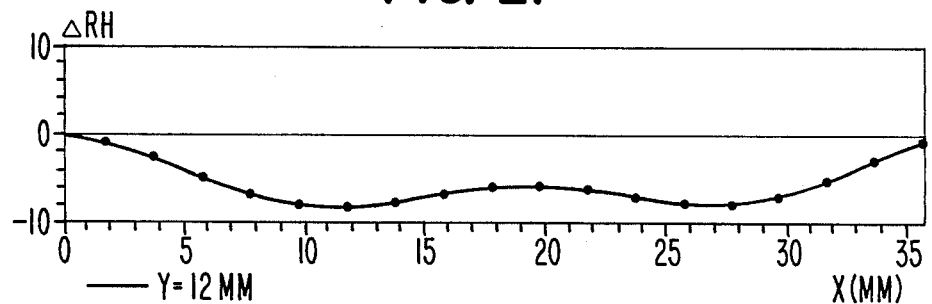
Figure 2G:
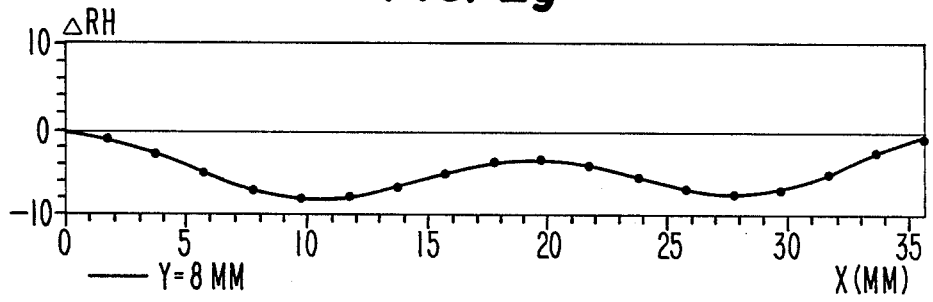
Figure 2H:
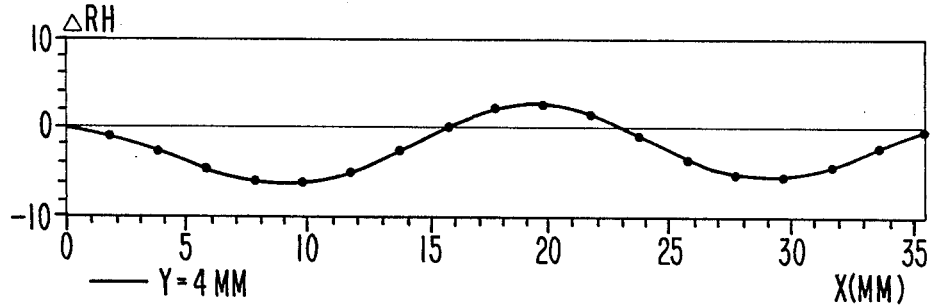
Figure 2I:
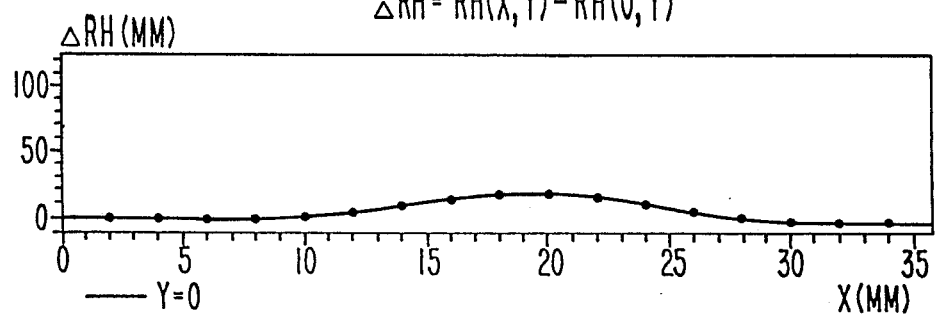

From approximately y =20 mm (FIG. 2d) on at approximately x =18 to 20 mm, occurs an intermediate maximum in the course of the radius of curvature, which rapidly becomes bigger with diminishing y-values (FIGS. 2e–2h). Although the radius of curvature still decreases in the lower peripheral region of distant portion FT (y =4 mm) in the region of the main meridian, in the range x =18 to 20 mm, where the intermediate maximum occurs at bigger y-values, now a maximum value is yielded, at which the radius of curvature is already greater than the value of the radius of curvature at the main meridian (FIG. 2h). At even bigger x-values the radius of curvature, however, decreases again to values smaller than the radius of curvature at the main meridian.

Figure 2J:
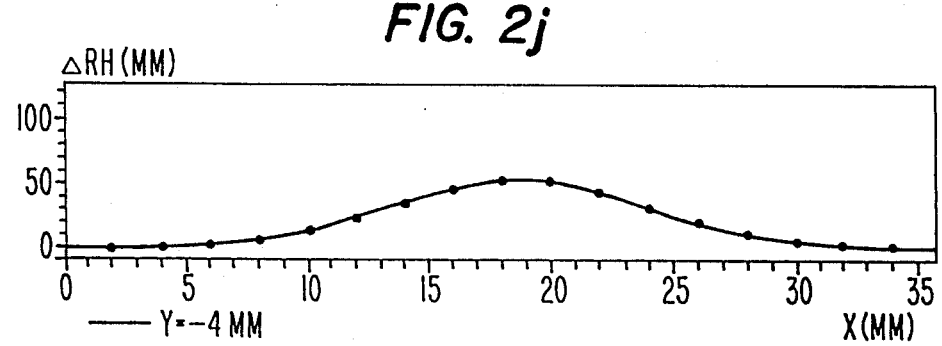
Figure 2K:
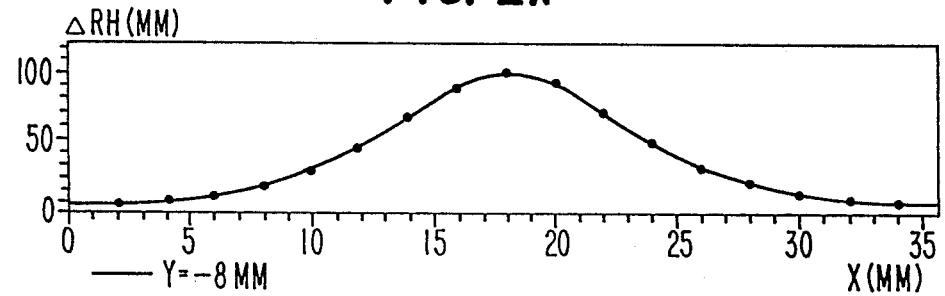
Figure 2L:
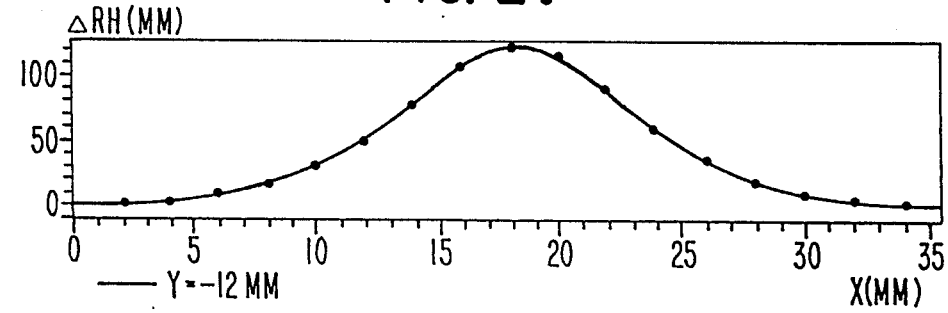

Upon entering the progression zone PZ, the radius of curvature is initially practically constant in the region of the main meridian and then reaches a maximum value in the range x 20 mm (FIG. 2h), which rapidly becomes bigger at diminishing y-values and reaches values differing more than 100 mm from the radius of curvature at the main meridian (FIG. 2j ff.) in the lower region of the progressive zone PZ or in the upper region of the reading portion.

Figure 2M:
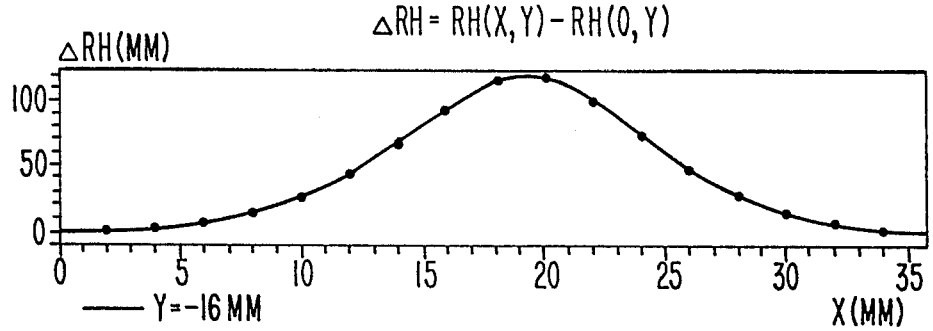
Figure 2N:
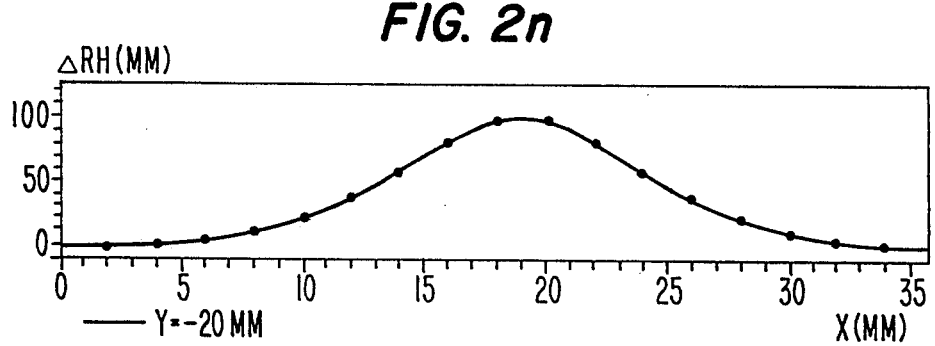
Figure 2O:
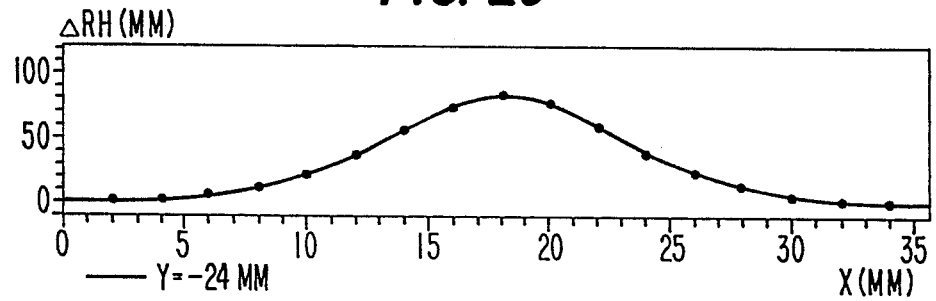
Figure 2P:
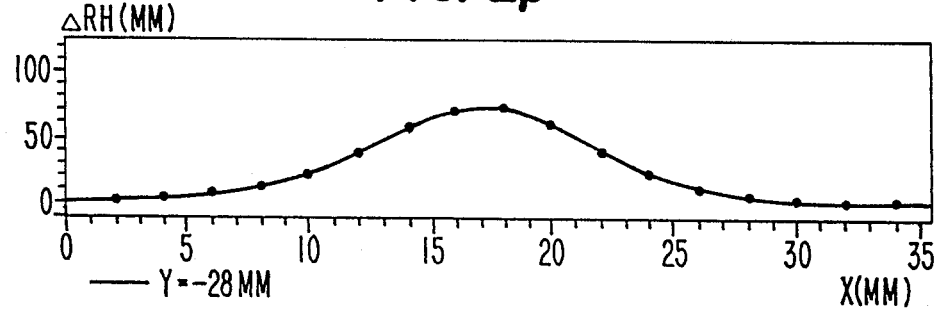

The difference between the maximum radius of curvature, which continues to lie at x-values between approximately 18 mm and 20 mm for each horizontal section, continues to decrease with further diminishing y-values (FIG. 2m, ff.).

This course of the radii of curvature rh(x) of horizontal sections as a function of distance x from the main meridian, illustrated in FIGS. 2a–2g is a result of the invented surface design:

As an inventive element, the course of the change in curvature Δrh=rh(x,y)−rh(0,y) of horizontal sections (y=const.) as a function of the distance from the main meridian is yielded by superimposing two functions $F_1$ (x,y) and $F_2$ (x,y):

$$\Delta rh = F(x,y,) = F_1(x,y) + F_2(x,y)$$

In accordance with the first function $F_1$ (x,y), the radius of curvature in the illustrated preferred embodiment, in which the progressive surface is the front surface, initially increases and reverses at a distance of approximately 20 mm from the main meridian. In accordance with the second function $F_2$ (x,y), the radius of curvature initially decreases, whereby the change of the radius of curvature also reverses again at a distance of approximately 20 mm from the main meridian.

As an inventive element, the functions $F_1$ and $F_2$ are topologically the same for all the horizontal sections, but the absolute values of the two functions change in reverse along the main meridian.

Figure 3:
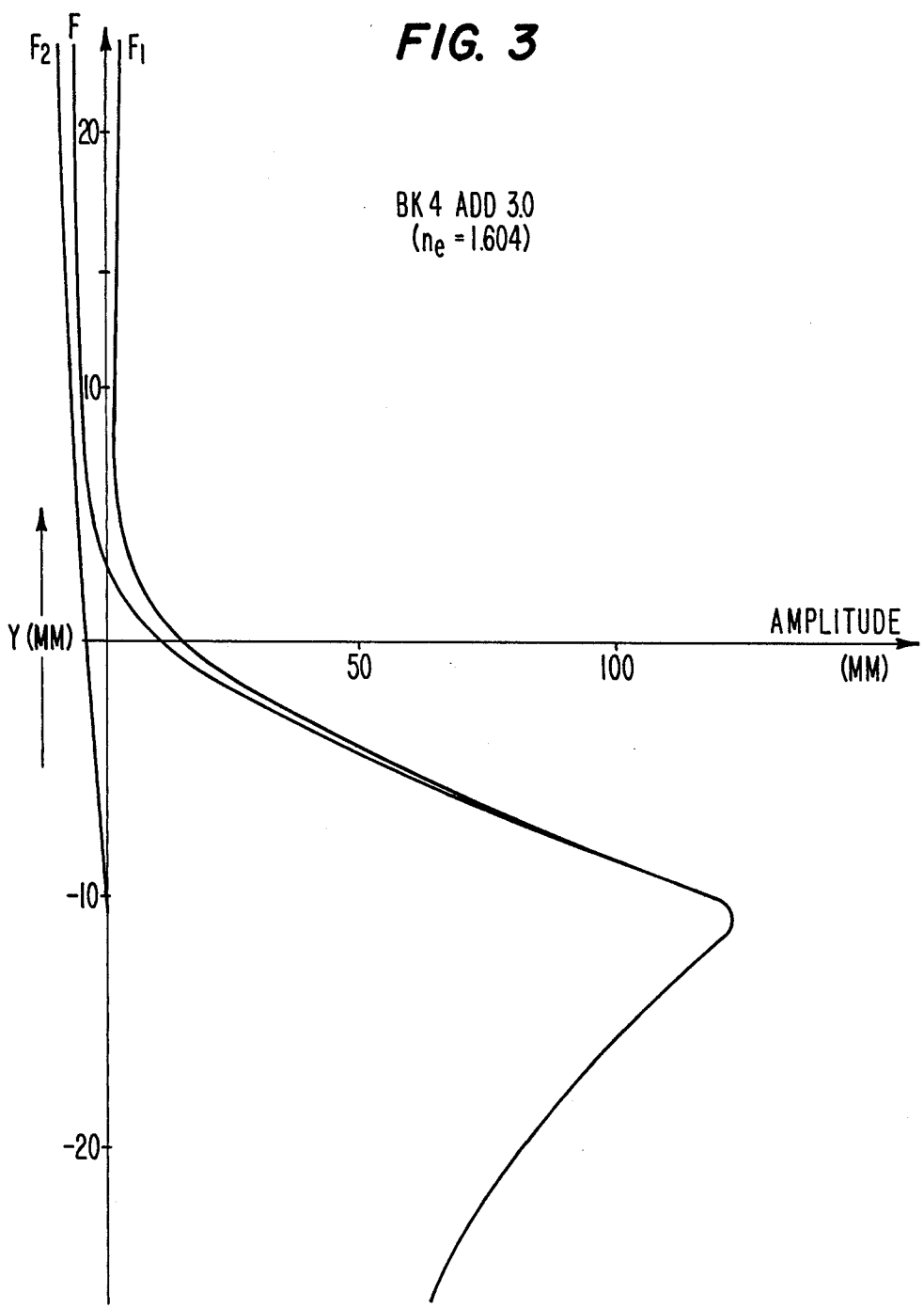
FIG. 3 shows the change of the maximum value of functions $F_1$, $F_2$, and F.

FIG. 3 shows the change of the maximum value of the functions $F_1$ and $F_2$ as a function of y. The boundaries of the distant portion FT, of the progressive zone PZ and of the reading portion NT are also indicated in FIG. 3. As can be seen in FIG. 3, the maximum value of function $F_1$ in the lower region of the progressive zone reaches a maximum and then rapidly decreases to a small value in the region of the distant portion. Function $F_2$, on the other hand, has a maximum value in the distant portion and already decreases in the intermediate portion of the progressive zone PZ to such a small value that it is no longer effective compared to function $F_1$. The maximum values of function $F_2$ is also small compared to the maximum value of function $F_1$, but it is distinctly bigger than the value of function $F_1$ at the same y-values. For one strip to the left and right of the main meridian at least in the region of the distant portion the following holds:

$$\delta F_2/\delta x \ (x=x_o, y=y_o) > \delta F_1/\delta x \ (x=x_o, y=y_o)$$

where $\delta F_2/\delta x$ and $\delta F_1/\delta x$ represent first derivatives of the functions $F_2$ and $F_1$ from x.

Moreover, the maximum amplitudes of function $F = F_1 + F_2$. yielded by superimposing the two functions, are indicated in FIG. 3.

Figure 4:
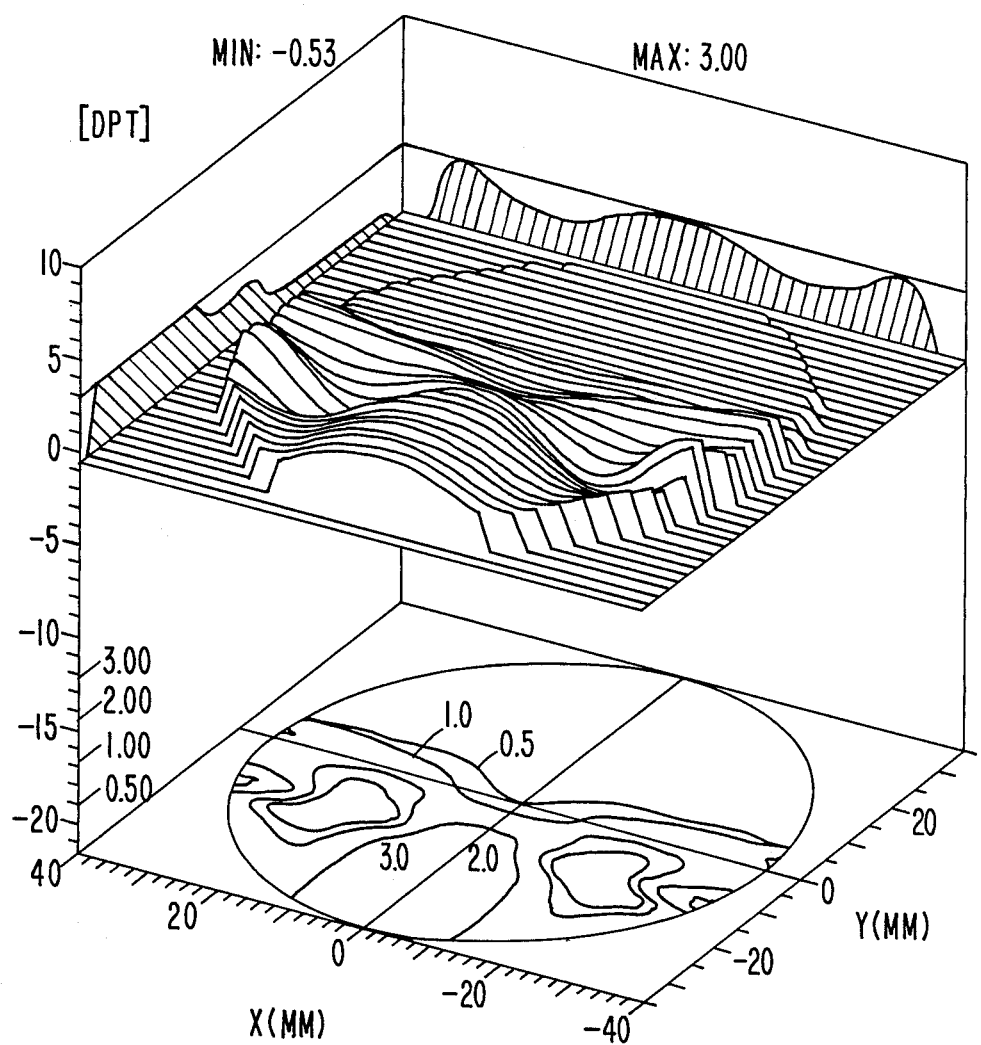
FIG. 4 shows the surface refractive power in a perspective representation.
Figure 5:
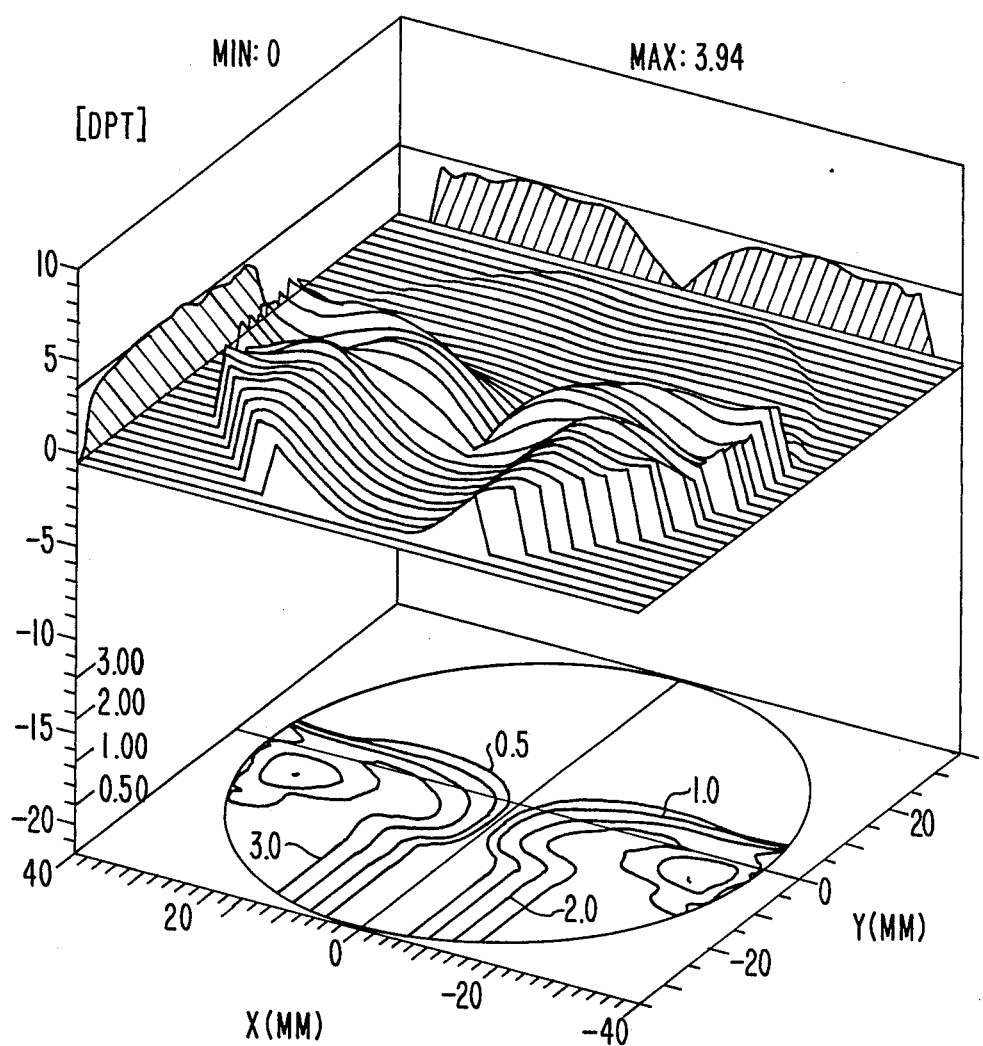
FIG. 5 shows the surface astigmatism in a perspective respesentation.

FIGS. 4 and 5 illustrate in a perspective representation the course of the surface refractive power as well as the surface astigmatism of the invented ophthalmic lens, the surface of which is depicted in FIGS. 1 to 3.

As can be seen in FIG. 4 the lines of the same refractive power run practically in a horizontal direction in the progressive zone region near the main meridian, thus the wearer has a pleasant uniform progressive increase if the glance is not lowered exactly along the main meridian. FIG. 5 shows that the surface astigmatism in the lateral peripheral regions reaches values like in state of the art ophthalmic lenses with a comparable addition, but that the change in the surface astigmatism is comparably small; in other words that there are far fewer "ravines" in the "mountains", which depict the surface astigmatism in the perspective representation, than in comparable known ophthalmic lenses, i.e. ophthalmic lenses with the same basal curve and the same addition.

In the preceeding section the present invention has been described using a preferred embodiment without the intention of limiting the scope of the overall inventive idea, which can, in particular, be drawn from the claims hereto.

The illustrated preferred embodiment has a basal curve of 4 dpt. and the addition of 3.0 dpt; furthermore, a refractive index n =1.604 is presupposed. Naturally, the same advantages are yielded as in the illustrated preferred embodiment if the fundamental overall inventive idea is applied while having other basal curves, additions and refractive indices. Thus, in particular, it is possible to fabricate the invented ophthalmic lens with a plastic material having a refractive index of 1.50 or with a glass lens having a refractive index of 1.525 or 1.7.

Moreover, the main meridian in the illustrated embodiment is a plane curve. The fundamental inventive idea to design an ophthalmic lens by superimposing two functions, may, however, be applied to ophthalmic lenses, in which the main meridian is a sinuous curve following the main line of vision, that is the line of the points of penetration of the rays of vision when glancing down. The shape of such main meridians is known from the literature, thus it does not need to be dealt with here in more detail.

However, the invented design of the surface also yields such a wide progressive zone and such a wide reading portion even if the main meridian is plane, so that even a deviation from the main line of vision from the main meridian does not cause aberrations, which are disturbing to the wearer.

Of course, it is also possible to grind the invented ophthalmic lens tilted in the known manner into a spectacle frame and/or to fabricate the lens decentered; that is to say that the main meridian does not run through the geometric center of the round raw lens.

In particular, the lens can already be calculated in the "use position", i.e. not only to include the astigmatism of oblique bundles in the correction, but also to take possible "horizontal symmetries" in these position into account. With regard to this, reference is again made to literature on the subject.

The described preferred embodiment is an ophthalmic lens intended for normal application, wherein great importance is attached to a comparatively large distant portion and a reading portion located below it.

The fundamental inventive ideas, however, may be applied to ophthalmic lenses, in which the reading portion is meant to be comparatively large and the distant portion, in contrast, comparatively small; by way of illustration, the reading portion may be located above the distant portion, as is often required, by way of illustration, in special lenses, such as pilot or screen spectacles.

What is claimed is:

1. A progressive power ophthalmic lens comprising at least one surface contributing to an increase in refractive power from a distant portion via a progressive zone to a reading portion, the radii of curvature rh of horizontal section curves of the at least one surface contributing to the increase in refractive power and having horizontal planes where y is a constant so that a function of a distance x from a main meridian decreases in a front surface in a region of the main meridian in the distant portion and increases in the reading portion and increases in a rear surface in the distant portion and decreases in the reading portion, a course of change of curvature $\Delta rh = rh(x,y) - rh(0,y)$ reversing with increasing distance x from the main meridian, the course of the change in the curvature of the horizontal section curves with increasing distance in the x direction from the main meridian being yielded by superimposing first and second functions $F_1(x,y)$ and $F_2(x,y)$, where $\Delta rh = F(x,y) = F_1(x,y) + F_2(x,y)$, the first function $F_1(x,y)$ providing that the radius of curvature initially increases in the front surface or decreases in the rear surface, whereby the change in the radius of curvature reverses at a distance of 14 to 26 mm from the main meridian, the second function $F_2(x,y)$ providing that the radius of curvature initially decreases in the front surface or increases in the rear surface, whereby the change in the radius of curvature reverses at a distance of 14 to 26 mm from the main meridian, the absolute values of the amplitudes of the first and second functions changing in reverse along the main meridian at least in the progressive zone, and for one strip on opposite sides of the main meridian at least in the region of the distant portion a relationship is provided that $\delta F_2/\delta x$ $(x=x_o, Y=y_o) > \delta F_1/\delta x$ $(x=x_o, y=y_o)$, where $\delta F_1/\delta x$ and $\delta F_2/\delta x$ represents the first derivations of the functions $F_1$ and $F_2$ from x.

2. An ophthalmic lens according to claim 1, wherein the amplitude of the second function is a maximum in the distant portion and is substantially 0 in the reading portion.

3. An ophthalmic lens according to claims 1 or 2, wherein the amplitude of the first function initially increases from a lower edge of the ophthalmic lens to a maximum value in the region of an upper boundary of the reading portion and then decreases to a value >0 in the region of the distant portion.

4. An ophthalmic lens according to claim 1, wherein the radius of curvature of the horizontal section curves in an upper region of the distant portion is substantially constant between a distance x of about 10 mm and 25 mm from the main meridian.

5. An ophthalmic lens according to claim 1, wherein a relationship of absolute values of the maximum amplitudes of the first and second functions is greater than 10:1.

6. An ophthalmic lens according to claim 5, wherein the relationship of the absolute values of the maximum amplitudes of the first and second functions is between 15:1 and 25:1.

7. An ophthalmic lens according to claim 1, wherein none of the horizontal section curves has a substantially constant radii of curvature.

8. An ophthalmic lens according to claim 1, wherein the radii of curvature of the horizontal sections in the progressive zone initially become smaller with an increasing distance x from the main meridian and subsequently become larger than at the main meridian or initially larger and subsequently substantially the same size as at the main meridian.

9. An ophthalmic lens according to claim 1, wherein a distance from a point of the main meridian at which the change of curvature reverses in accordance with the first function decreases in a direction of the lower edge of the ophthalmic lens.

10. An ophthalmic lens according to claim 1, wherein the ophthalmic lens has no spherically constructed region.

11. An ophthalmic lens according to claim 1, wherein the main meridian o the at least one surface contributing to an increase in refractive power is plane.

12. An ophthalmic lens according to claim 1, wherein a surface astigmatism on the main meridian is substantially 0 dpt in the distant portion and in the reading portion, and does not exceed a value of 0.5 dpt in the progressive zone.

* * * * *